United States Patent [19]

Jove et al.

[11] Patent Number: 4,914,398
[45] Date of Patent: Apr. 3, 1990

[54] METHOD AND CIRCUITRY TO SUPPRESS ADDITIVE DISTURBANCES IN DATA CHANNELS CONTAINING MR SENSORS

[75] Inventors: Stephen A. Jove, Watsonville; Klaas B. Klaassen; Jacobus C. L. van Peppen, both of San Jose, all of Calif.

[73] Assignee: International Business Machines Corporation, Armonk, N.Y.

[21] Appl. No.: 226,634

[22] Filed: Aug. 1, 1988

[51] Int. Cl.$^4$ .......................... H03K 5/00; H04B 1/10
[52] U.S. Cl. ..................................... 328/167; 328/162; 307/520; 307/555; 307/350; 455/296; 455/303; 333/14
[58] Field of Search ............... 307/350, 358, 359, 555, 307/520; 328/165, 167, 169, 151, 162; 455/296, 303, 304, 305–308, 222, 225; 333/14; 330/109, 149, 151

[56] References Cited

U.S. PATENT DOCUMENTS

| | | | |
|---|---|---|---|
| 3,473,131 | 10/1969 | Perkins | 328/163 |
| 3,566,281 | 2/1971 | Baumann | 328/171 |
| 3,588,705 | 6/1971 | Paine | 328/165 |
| 3,903,485 | 9/1975 | Dolby | 328/169 |
| 4,141,494 | 2/1979 | Fisher | 307/351 |
| 4,163,909 | 8/1979 | Harr | 307/351 |
| 4,356,389 | 10/1982 | Quirey | 235/455 |
| 4,433,256 | 2/1984 | Dolikian | 328/169 |
| 4,698,597 | 10/1987 | Merli et al. | 328/165 |
| 4,739,518 | 4/1988 | Bickley et al. | 455/303 |
| 4,780,623 | 10/1988 | Yagi | 328/165 |

Primary Examiner—Stanley D. Miller
Assistant Examiner—Timothy P. Callahan
Attorney, Agent, or Firm—Henry E. Otto, Jr.

[57] ABSTRACT

A method and circuitry are disclosed for suppressing additive transient disturbances in a data channel; e.g., due to thermal transients caused by an MR transducer contacting moving a storage surface. Positive and negative envelope detectors each have their inputs connected to the channel, and provide respective outputs which are summed and contain an envelope component and a residue component. A buffer interconnects the detectors to allow both detectors to follow rapid positive excursions of the data channel signal. A nonlinear signal-adaptive filter is connected to the summed output to further reduce the residue component. The data channel signal (or preferably the output from a delay means connected to the channel) is summed with the output from the filter. The relative amplitudes of these two outputs is set such that the resulting summed output signal is free of additive disturbances.

11 Claims, 4 Drawing Sheets

METHOD AND CIRCUITRY TO SUPPRESS ADDITIVE DISTURBANCES IN DATA CHANNELS CONTAINING MR SENSORS

FIELD OF THE INVENTION

This invention relates to a method and circuitry for detecting and removing additive transient disturbances in a data channel, and more particularly, to a method and circuitry for suppressing electrical transients caused by a temperature change in a magneto-resistive (MR) sensor due to physical contact of said sensor with the recording surface of a rotating magnetic disk.

BACKGROUND OF THE INVENTION

Disturbances which occur in a data channel can be categorized as either additive or multiplicative. An undesirable additive disturbance signal is simply added to the information (data) signal. An undesirable multiplicative disturbance or data density change causes a modulation of the data signal.

In a data channel where the signal sensing transducers are magneto-resistive (MR) sensors exposed to the air in the air bearing surface of a slider assembly and a rotating magnetic disk, additive disturbances can occur due to physical frictional contact of the sensor(s) with the moving recording surface of the disk. The disturbances result from the friction-generated elevated temperature (up to 120° C) at the contact spot. This produces a small yet sudden increase in temperature of the MR sensor; e.g., in the order of 1° C averaged over the entire sensor within about 50 to 100 nanoseconds. Due to the nonzero temperature coefficient of resistance of the MR sensor (approximately 0.003/°C for permalloy), the sensor resistance will increase with this sudden temperature rise. The heat conducted into the MR sensor from the hot spot will diffuse slowly to the environment of the sensor, causing the resistance increase to decay slowly to the original value. Typically, a drop to about 30% of the thermally induced resistance change will occur in 1.5 to 5 μs. The MR sensor is used for detecting magnetic signals by the magneto-resistive effect. The sensor is biased with a constant direct (DC) current to convert the resistance changes due to the magnetic information into a data voltage signal for later amplification. The thermally induced resistance change will then lead to an additive disturbance upon which the data signal is superimposed. The nonlinearity of such an MR sensor increases with increasing magnetic signal excursions around its bias point. Therefore, these magnetic excursions are kept sufficiently small giving at most a relative change in sensor resistance of + 0.3%. Therefore thermal disturbance signals can be up to four times the base-to-peak data amplitude and possibly even greater.

Such a combination of signal and disturbance causes many problems with signal detection in the data channel. The automatic gain control (AGC) circuit in the channel may fade out quickly during the transient and recover only slowly. Even if the AGC circuit were to accommodate the disturbed signal, the thermal transient would still result in a peak shift; i.e., the data signal is differentiated for peak detection; and as a result of this the thermal transient will also be differentiated. This leads to an extra zero crossing and a shift of the zero-crossing level directly after the thermal transient.

There is a need for a method and apparatus for suppressing additive transient disturbances that are caused in a data channel by a temperature change (hereinafter referred to as a thermal asperity) in an MR sensor due to frictional contact with the moving recording surface of a magnetic disk. Such suppression cannot be achieved by the prior art approaches known to applicants because the MR sensor as used in hard disk products is not provided with a center tap (which could be utilized to balance out thermal transients), the spectral content of the thermal transient disturbance is too close to the spectral content of the data signal to be filtered out, and the problems associated with high-frequency AC biasing are for all practical purposes unsolvable.

In addition to the prior art approaches above described, U.S. Pat. 3,566,281 constitutes the most pertinent prior patent art of which applicants are aware. This patent discloses positive and negative peak detectors which are offset by a constant voltage and averaged and subtracted from a delayed input signal. Note that the outputs of each detector are cross connected for resetting each detector to zero after the pulse has been processed. This patent merely describes clipping level circuitry in which, as the positive peak detector detects a positive peak, the negative peak detector is reset to zero, and vice versa. This patent and others (such as U.S. Pat. Nos. 3,473,131 and 4,356,389) less pertinent do not and cannot solve the problem to which applicants' invention is directed. They do not disclose means for insuring that both detectors respond rapidly to the onset of an additive disturbance, or means to reduce residue components and produce an output signal free of the additive disturbance.

SUMMARY OF THE INVENTION

A method and circuit are disclosed for suppressing additive transient disturbances in a data channel. These disturbances may be due to thermal asperity transients caused by an MR transducer contacting a moving storage surface. More specifically, a positive envelope detector and a negative envelope detector both have their inputs connected to the channel, and provide respective outputs which are summed and contain an envelope component and a residue component. A buffer interconnects the detectors to allow both detectors to follow rapid positive excursions of the data channel signal. A nonlinear signal-adaptive filter is connected to the summed output to reduce the residue component. A delay means preferably is connected to the channel, and its output is summed with the output from the filter. The relative amplitudes of these two outputs is set such that the resulting summed output signal is free of additive disturbances.

DESCRIPTION OF PREFERRED EMBODIMENT

Figure 1:
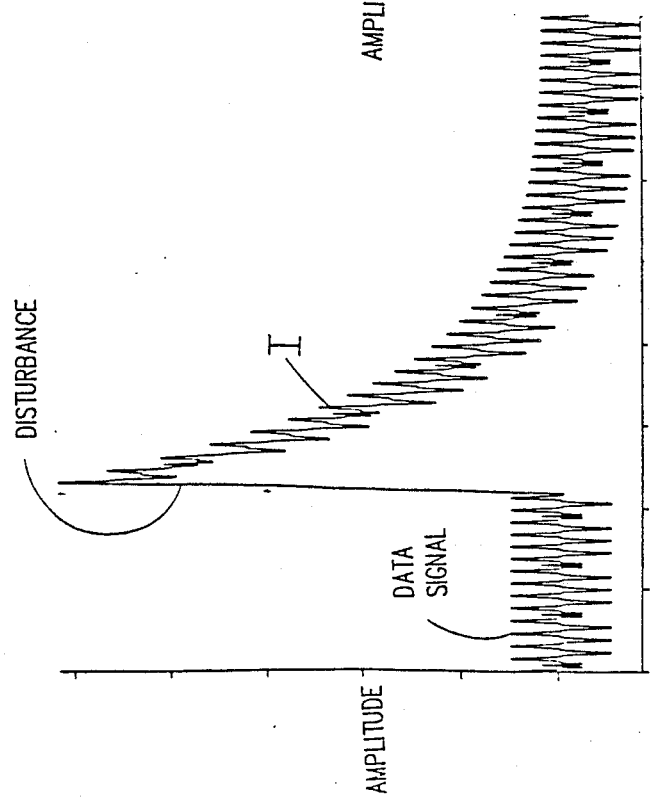
FIG. 1 depicts an input data signal, and an additive transient disturbance superimposed on the data signal in a data channel.

A data signal I, without and with an additive transient disturbance superimposed thereon, are depicted in FIG. 1. According to the invention, the circuit illustrated in FIG. 2 suppresses such additive transient disturbances to provide output signals free of additive disturbances. This circuit insures that only the additive component (such as due to thermal transients) will be detected and not the multiplicative component (due to density modulation resulting from bit density variations).

Figure 3:
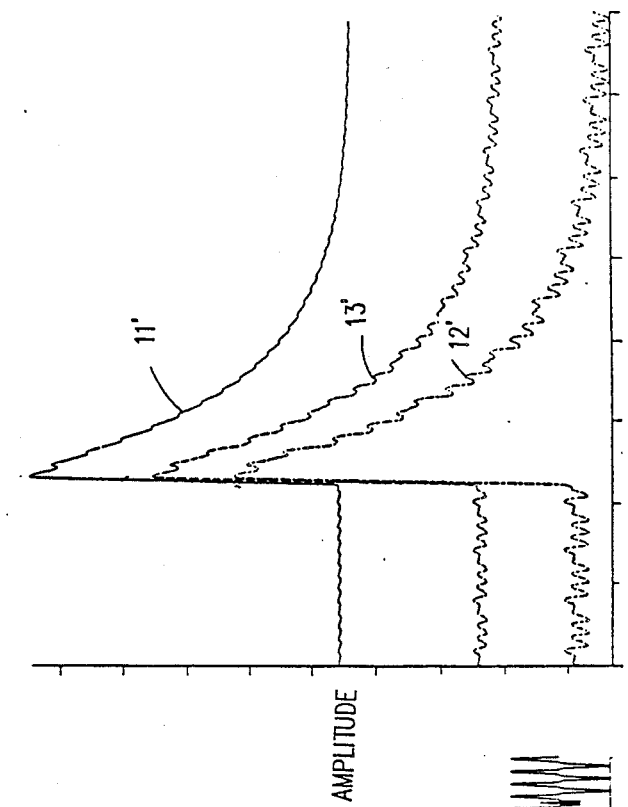
FIG. 3 depicts negative and positive envelope signals and an estimated disturbance signal resultant from the sum thereof divided by two.
Figure 2:
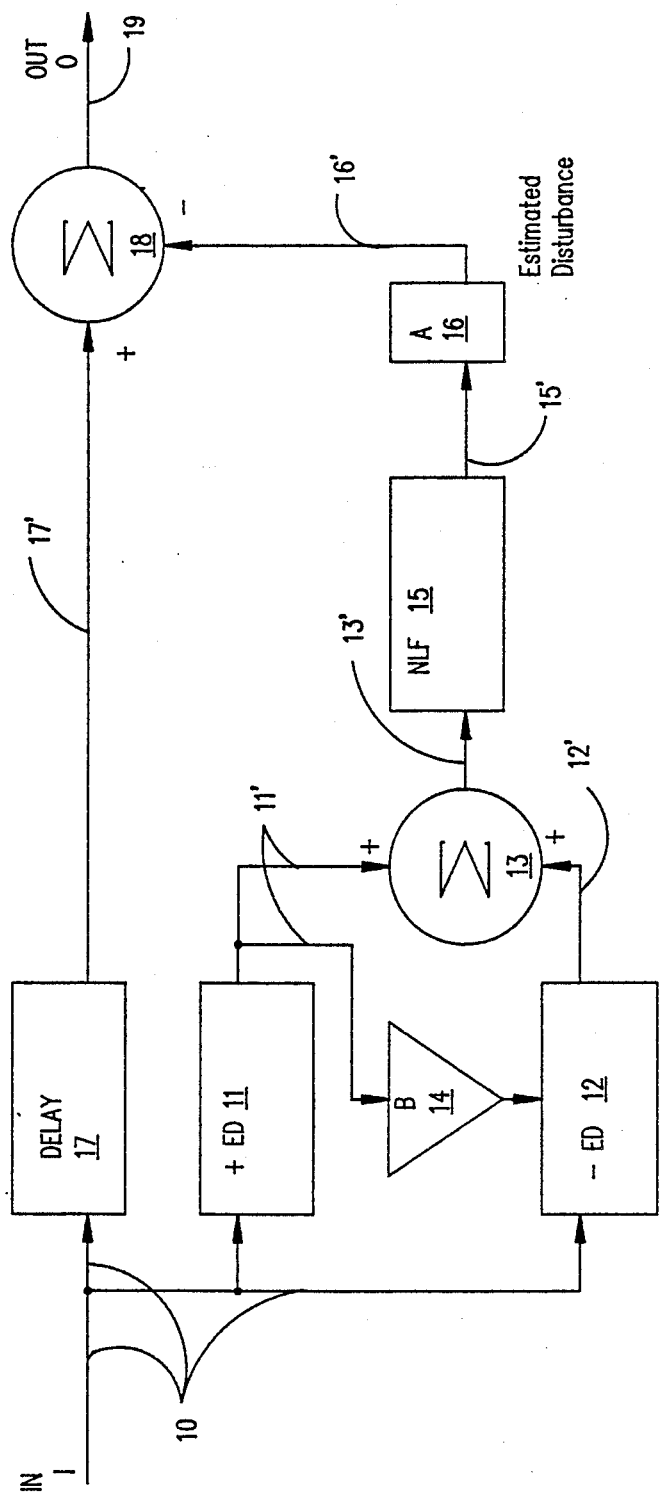
FIG. 2 is a schematic diagram of a circuit embodying the invention for suppressing the additive transient disturbance superimposed on the data signal in the data channel.

Referring to FIG. 2, assume initially that the input signal I contains both data and a superimposed additive disturbance due, for example, to a thermal asperity. Signal I is fed via line 10 to both a positive envelope detector 11 and a negative envelope detector 12. The positive envelope 11' and negative envelope 12' of signal I (FIG. 3) are summed at block 13 to produce a summed signal 13' (FIG. 3). Envelope signals 11',12' contain not only an envelope component but also a residue component that is pattern dependent and correlated to the input data in signal I. These correlated residue components result from the small time constant used in the envelope detectors 11,12. Detectors 11,12 are connected in a "peristaltic" fashion; i.e., the positive envelope signal pulls up the negative envelope signal simultaneously at the onset of a thermal transient disturbance, causing the negative envelope detector 12 to follow the fast positive signal excursions that then occur. This peristaltic connection alters the residue profile of the negative envelope signal 12' with respect to that of the positive envelope signal 11'.

A buffer 14 is preferably interposed between the outputs of detectors 11,12 in parallel with summing block 13 to accomplish the peristaltic connection. The signals 11',12' are added by the summing block. To reduce the correlated residue in the first estimate of the additive disturbance as denoted by the signal in 13', a nonlinear signal-adaptive filter 15 is preferably used. Filter 15 is constructed as a low-pass network with a single pole that is a function of the difference in voltage between the filter output 15' and input 13' (the DC gain of the filter being unity).

Figure 5:
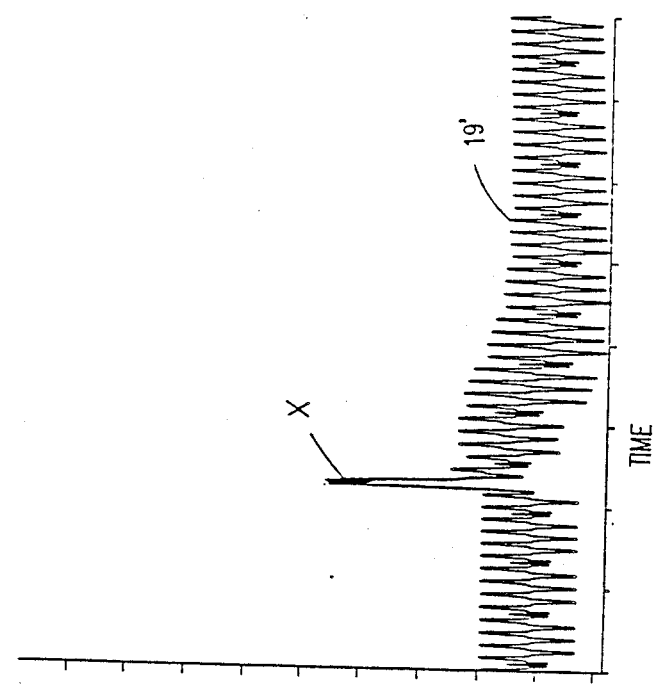
FIG. 5 depicts an output signal from which the estimated disturbance signal (i.e. the output of the non-linear signal adaptive filter) has been subtracted.
Figure 4:
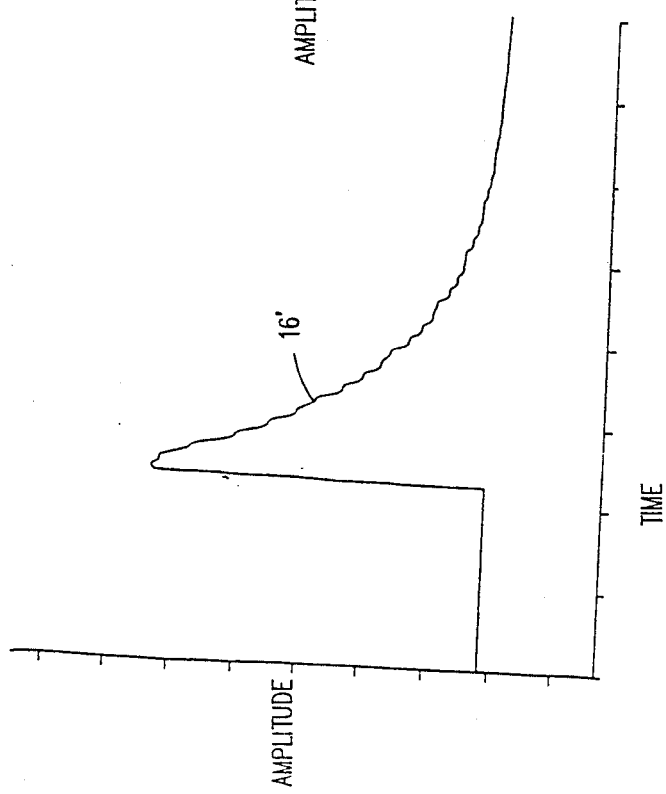
FIG. 4 depicts an estimated disturbance signal after the application of non-linear signal adaptive filtering.

When the signal across filter 15 is low in amplitude, the pole frequency is low and the aforementioned correlated residue is filtered out. When this signal is high in amplitude, as it is when a thermal asperity occurs, then the pole frequency moves up to track the fast rise time that occurs at the onset of the thermal transient disturbance. During decay of the transient disturbance, this signal difference becomes small again, permitting the pole frequency to assume its normal low value. This filtered signal 15' is then attenuated two times by attenuator 16 to the appropriate level and used as the estimated disturbance signal 16' (FIG. 4). A delay means 17, having a delay time equal to that of the disturbance estimating circuitry just described, preferably is interposed between a branch of input line 10 and a summing block 18. Depending upon whether the gain blocks 20, 29 and 16 are of the inverting or noninverting type, block 18 adds to or subtracts from the delayed version of input signal I the estimated disturbance signal 16' to produce an output signal 0 in line 19 such that said output signal is free of additive disturbances (see FIG. 5). Note that FIG. 5 shows the estimated disturbance signal obtained without use of the delay means 17; however, by use of the delay means the glitch at X can desirably be eliminated.

Assume now that the input signal I consists solely of data and noise; i.e., no additive disturbance. Under the assumed condition, the signal will still be fed through the envelope detectors 11, 12. With no additive disturbance, the output from block 13 will constitute only the residue component. Thus the estimated disturbance signal 16', which represents only the left over after the nonlinear filter 15 filters out the residue component, will be summed at block 18 with the delayed input signal 17' from delay element 17.

Figure 6:
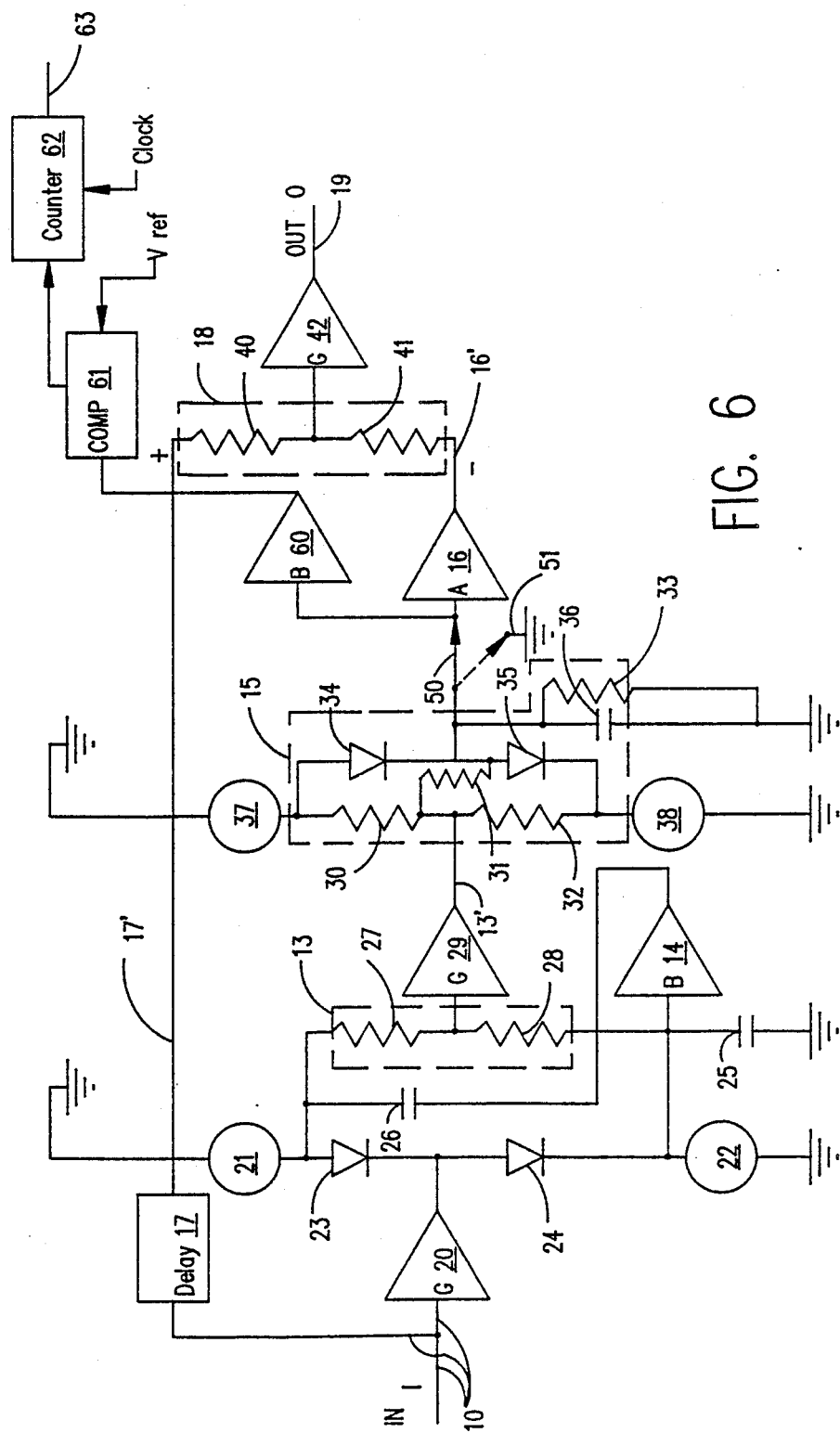
FIG. 6 depicts a more detailed schematic diagram of the circuitry illustrated in FIG. 2.

A more detailed schematic representation of the circuitry of FIG. 2 is shown in FIG. 6 in which identical reference numerals are used, where appropriate.

Input signal I in line 10 is amplified by a gain block 20. Current sources 21, 22 are used to bias diodes 23, 24, respectively, used in the envelope detectors 11, 12. Positive envelope detector 11 comprises diode 24 and capacitor 25. Negative envelope detector 12 comprises diode 23 and capacitor 26. Capacitor 26 would normally be connected to ground as capacitor 25 is; however, because the onset of a thermal asperity transient has a very fast associated rise time, diode 23 would normally be temporarily shut off and thus not permit the negative envelope to follow the signal. Since a thermal asperity-induced event produces a signal excursion in one polarity only, the previously described "peristaltic" connection is accomplished by connecting capacitor 26 to capacitor 25 preferably by way of buffer 14 instead of to ground. This connection permits both envelope detectors 11, 12 to follow fast positive signal excursions. However, the charging and discharging of both capacitors 25, 26 is now coupled due to the peristaltic connection. To prevent such coupling of charge paths and also minimize the amplitude of the aforementioned residue component, buffer 14 is inserted between capacitors 25, 26, as shown.

Summing block 13 comprises resistors 27, 28. The resultant summed signal is amplified by gain block 29 and fed into the nonlinear filter 15. Filter 15 comprises resistors 30, 31, 32, 33, diodes 34, 35 and capacitor 36. Current sources 37, 38, bias diodes 34, 35 to an optimal operating point by generating a bias voltage with resistors 30, 32. Capacitor 36 sets the time constant of the nonlinear filter 15 with the differential resistance associated with diodes 34, 35, the resistance of resistor 33 being much larger than said differential resistance. The impedance of diodes 34, 35 therefore determines the overall pole location of filter 15. As a result, it is adaptive to the voltage between the input and output of the filter. If this voltage difference is high, a high filter roll-off frequency will result, whereas a low voltage difference will yield a low filter roll-off frequency. Resistor 31 is preferably provided to limit the minimum filter roll-off frequency (i.e., the maximum time constant).

Attenuator 16 comprises a gain block that provides a negative-going output disturbance signal estimate. Summing block 18 comprises resistors 40, 41. The estimated disturbance signal 16' is summed with the delayed input signal 17' from delay means 17, and the resultant signal is amplified by a gain block 42 to produce in line 19 the data output signal 0 free of the additive disturbance.

In a preferred embodiment of the invention, the circuitry above described would be interposed in the data channel between an arm select amplifier (not shown) and an automatic gain control (AGC) circuit (not shown) by connecting line 10 to the select amplifier and line 19 to the AGC circuit. A switch 50 is preferably provided which, when in the position shown, provides the data output signal in line 19 free of additive disturbances. However, switch 50 is preferably normally connected to ground via line 51 and actuated to its shown position by suitable means (not shown) only when uncorrectable errors are detected during a retry operation; such arrangement is especially desirable when data errors due to additive disturbances occur very infrequently, as will usually be the case.

The apparatus as thus far described may be used to warn of an imminent "head crash" by adding the optional circuitry now to be described. ("Head crash" is defined as near continuous contact of the MR head or sensor with the surface of the rotating disk.) This optional circuitry comprises a buffer 60 having its input commoned to the input to attenuator 16. The output of buffer 60 is compared at 61 to a reference voltage $V_{ref}$ to provide an output to counter 62 whenever a thermally induced additive disturbance is sensed. Counter 62 will generate a warning signal in line 63 to initiate a desired control operation, such as shutting down the disk file to prevent further damage, whenever there is more than a preselected number of counted disturbances (or, if preferred, more than a preselected number per predetermined period of time).

This optional circuitry may also be used for asperity mapping of the disk surface and/or MR sensor glide height testing during manufacture.

It will now be seen that a simple and effective method and circuitry has been provided for removing additive transient disturbances in a data channel; e.g., such as due to a thermal asperity resulting from contact of the head or sensor with the surface of the rotating disk. Also, optionally, the number and/or frequency of these disturbances can be counted and used to trigger a desired control operation.

If desired, the delay means 17 may be eliminated. However, if this is done, there will be a difference in the timing of the estimated disturbance signal 16' with respect to the input data signal I in line 10 containing the unprocessed asperity. This difference will cause in the output signal 0, an amplitude disturbance the length of which is proportional to said timing difference.

While the invention has been described with respect to a preferred embodiment and optional modifications thereof, it will be understood that various changes may be made in the method and circuitry herein described. Accordingly, the embodiment illustrated is to be considered merely illustrative and the invention is not to be limited except as specified in the claims.

What is claimed is:

1. Circuitry for suppressing additive transient disturbances in an input data signal, comprising
    a positive envelope detector and a negative envelope detector, both having the data signal as their inputs, and both having outputs containing an envelope component and a residue component;
    means interconnecting said detectors for insuring that both envelope detectors respond rapidly to the onset of an additive disturbance;
    first means for summing the envelope components;
    nonlinear signal-adaptive filter means connected to the summed envelope output for reducing the residue component; and
    second means for summing or subtracting the output derived from said filter means with or from, respectively, the input data signal for producing an output signal free of the additive transient disturbance.

2. Circuitry of claim 1, wherein the disturbances are due to thermal asperity transients.

3. Circuitry of claim 1, including means for attenuating the output of said filter means; and
    delay means for delaying the input data signal to said second summing means.

4. Circuitry of claim 1, including delay means for delaying said input data signal to said second summing means for a period of time sufficient to assure that the delayed input signal and the signal from said filter means will arrive at substantially the same instant at said second summing means.

5. Circuitry of claim 1, including
    means including means connected to said filter means responsive to a preselected number of additive transient disturbances that exceeds a predetermined amplitude threshold to initiate a desired control operation.

6. Circuitry of claim 1, including
    means including means connected to said filter means responsive to a preselected number of additive transient disturbances that exceeds a predetermined amplitude threshold per predetermined unit of time to initiate a desired control operation.

7. Circuitry of claim 1, wherein said interconnecting means comprises an impedance buffer to insure substantially simultaneous response of both envelope detector outputs to the onset of the additive transient disturbance.

8. Circuitry for suppressing an additive transient disturbance in an input data signal, comprising
    means providing one signal path for processing said data signal to estimate the magnitude and shape of said disturbance, said means including:
        a positive envelope detector and a negative envelope detector, both having the data signal as their inputs, and both having outputs containing an envelope component and a residue component;
        first means interconnecting said detectors for insuring that both envelope detectors respond simultaneously to the onset of the additive disturbance;
        second means for summing the envelope components;
        nonlinear signal-adaptive filter means connected to the summed envelope output for reducing the residue component;
    means providing another signal path for said data signal, including
        delay means having a delay time corresponding to the cumulative delays resultant from the processing through said one signal path for correspondingly delaying said data signal; and
    means for adding to or subtracting from said delayed data signal in said other path and disturbance as estimated by processing through said one path.

9. A method of suppressing an additive transient disturbance signal in an input data signal, comprising the steps of:
    deriving from the input signal positive and negative envelope signals, each having a respective pattern-dependent residue component correlated to the input signal;

constraining one of the envelope signals to follow fast signal excursions of the other of the envelope signals at the onset of a disturbance-causing event;

summing the envelope signals; and filtering the summed signal using a nonlinear signal-adaptive filter to reduce its residue content.

10. The method of claim 9, further including the step of:

attenuating the filtered signal for estimating the magnitude and shape of the disturbance signal; and adding to or subtracting from the input signal the estimated disturbance signal.

11. The method of claim 9, further including the steps of:

counting the number of additive transient disturbances exceeding a preselected threshold; and initiating a desired control operation whenever said number exceeds a preselected value.

* * * * *